July 21, 1936.　　J. K. HAMILTON　　2,048,379
REGULATOR
Filed Nov. 23, 1934
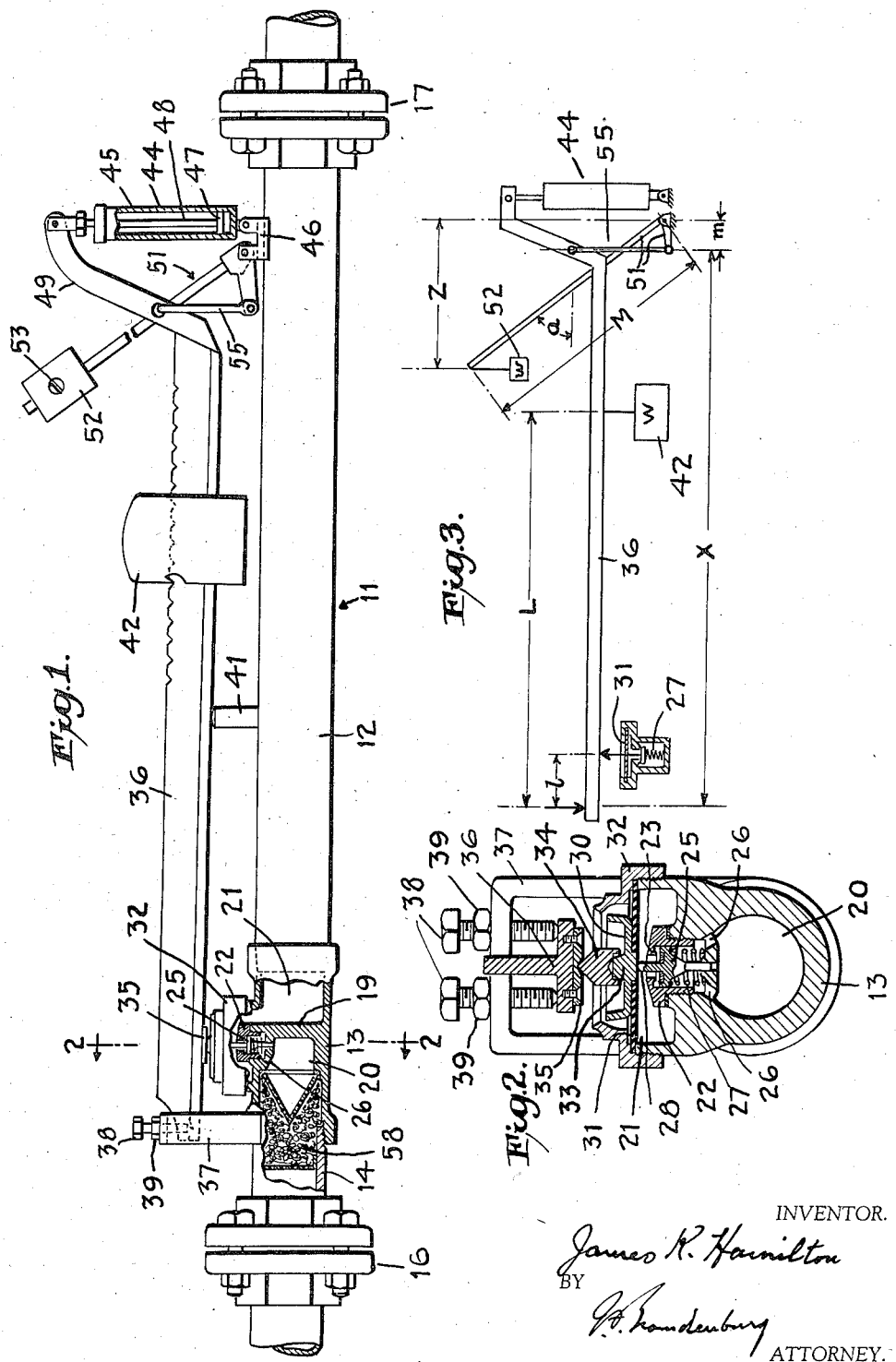
INVENTOR.
James K. Hamilton
BY
ATTORNEY.

Patented July 21, 1936

2,048,379

UNITED STATES PATENT OFFICE 2,048,379

REGULATOR

James K. Hamilton, Sunnyside, Long Island, N. Y., assignor to Air Reduction Company, Incorporated, New York, N. Y., a corporation of New York Application November 23, 1934, Serial No. 754,398

2 Claims. (Cl. 50—17)

This invention relates to pressure regulators (including reducing valves) for receiving gas at high pressure and delivering the gas at a reduced and constant, or nearly constant, delivery pressure. Pressure regulators are usually adjustable so that they can be set to hold constant any desired pressure within a range of possible delivery pressures.

The regulator of this invention may be used with gases of any kind derived from high-pressure sources. Oxygen, air, nitrogen, petroleum gases, high-pressure illuminating gas are some of the gases with which it may be used. For some purposes, such as the supply of oxygen to cutting and welding torches, it is particularly important to maintain the delivery pressure of the regulator as constant as possible. It is to be understood, of course, that pressure regulators, which operate in response to changes in the delivery pressure, can not maintain an absolutely constant delivery pressure because some slight variation must take place before the regulator operates to counteract the variation, but in a regulator of good construction these necessary fluctuations are corrected in their incipiency and are to all intents and purposes as if non-existent.

Mechanical limitations of the known types of diaphragm regulators, such as spring-stiffness, stiffness of the diaphragm if the diaphragm is of metal, which is scarcely ever desirable, and friction of the moving parts, have made it impossible, however, to keep the delivery pressure highly or satisfactorily constant when conditions under which the regulator operates vary between extremely wide limits. If the demand rate changes from zero, or some very small flow, to heavy flows, of the order of three or four thousand cubic feet per hour, the variation in the delivery pressure of known regulators becomes so large that it will interfere with the proper operation of the cutting or welding torches at stations to which oxygen or other gas is distributed.

Another difficulty is experienced when the gas travels through a long delivery line in passing from the regulator to the point or points of consumption, or when the delivery line is of small size in proportion to the amount of gas flowing. Under such conditions the pressure drop in the line increases rapidly as the demand rate increases and the pressure at the torch drops far below the delivery pressure of the regulator.

With a delivery line from which gas is withdrawn at a number of separate points in varying amounts, the pressure at any one outlet will vary in accordance with the amount of gas drawn from the other outlets because the increase in the demand rate causes a drop in the delivery pressure of the regulator and increases the pressure drop in the delivery line from the regulator.

No regulator which operates in response to changes in its delivery pressure only can compensate for variations in line pressure drop because this drop would occur even though the delivery pressure at the regulator remained constant.

It is an object of this invention to provide a regulator which maintains a more nearly constant delivery pressure than the known types of regulators when subject to wide variations in the demand rate.

Another object of the invention is to control the operation of a pressure regulator in response to changes in the demand rate as well as changes in the delivery pressure.

Another object of the invention is to maintain a substantially constant line delivery pressure at a distance from the pressure regulator notwithstanding wide changes which may occur in the rate of flow.

A more specific object is to provide a pressure regulator with means for compensating for the usual drop in delivery pressure as the rate of flow from the regulator increases. The compensating means can be used to hold the delivery pressure substantially constant, or to increase the delivery pressure of the regulator as the flow becomes greater. Such an increase in the delivery pressure can be used to offset the drop in pressure in the line as the rate of flow increases. Another object of the invention, therefore, is to increase the delivery pressure of a regulator as the gas flow from the regulator increases.

Other objects, features and advantages of the invention will appear or be pointed out as the specification proceeds.

In the accompanying drawing:

Fig. 1 is a side elevation, partly in section, showing a regulator embodying the invention;

Fig. 2 is an enlarged sectional view on the line 2—2 of Fig. 1; and

Fig. 3 is a diagram, on a reduced scale, showing the forces and lever arms of the regulator shown in Fig. 1 and illustrating the principle of operation of the compensating mechanism.

The regulator shown in Fig. 1 has a body 11 comprising a pipe 12 threaded into one side of a valve fitting 13, and a nipple 14 threaded into the other side of the valve fitting. The regulator body 11 has a union 16 at one end for connecting the regulator with a supply conduit and a union 17 at the other end for connection with a gas delivery line. The gas may come from a bank of high-pressure cylinders through a primary regulator (not shown) which keeps the inlet pressure of the regulator shown herein to a fairly narrow range while the cylinder pressure declines from a high value to the pressure at which the cylinders must be shut off. The instant regulator may serve as the second stage of a compound regulator, or as the second of two regulators in series, if the original source pressure has a widely declining range, or it may serve without any first-stage regulator if the high pressure of the source stays within reasonable limits. Thus, the regulator may be fed directly from a compressor.

A partition wall 19 divides the interior of the valve fitting 13 into a high-pressure chamber 20 and a reduced-pressure chamber 21. The partition wall 19 has an upper portion with a threaded recess, into which is screwed a thimble 22 having a port surrounded at its lower end by a lip 23 which serves as a valve seat. A valve element 25 coacts with the lip 23 to control the passage of gas from the valve chamber into the low-pressure chamber 21. The high-pressure chamber 20 communicates with the valve chamber through passages 26.

The valve element 25 is urged toward or against the lip 23 by a spring 27. A stem 28 extends upward from the valve element and into the reduced-pressure chamber 21, where it contacts with the center of a plate 30, which is secured to a diaphragm 31. The diaphragm is clamped against the upper end of the valve fitting by an annulus 32 threaded on the upper end of the valve fitting.

The plate 30 has a central hub 33 on which rests a block 34, which presents a pointed conical bearing for a concave surface on a lever 36 near its fulcrum, this surface being preferably provided by a piece 35 fastened to the under side of the lever. The force exerted by the lever 36 tends to flex the diaphragm 31 downward against the combined upward force of the spring 27 and the gas pressure in the reduced-pressure chamber 21.

A bracket 37 extends upward from the valve fitting 13 and over the end of the lever 36. The lever 36 is preferably of T section, and screws 38, threaded through the bracket 37 engage recesses in the side flanges of the lever. These screws are the fulcrum for the lever, and are locked by nuts 39.

An abutment 41 on the top of the pipe 12 limits the downward movement of the lever 36. A weight 42 is slidable along the lever 36 and can be set at greater or less distances from the fulcrum to adjust the regulator for higher or lower delivery pressures, as desired.

A dash-pot 44 is connected to the end of the lever 36 to prevent sudden movement of the lever and to keep the regulator from "hunting". The dash-pot 44 has a cylinder 45 pivoted to a bracket 46 on the pipe 12. A piston 47 in the cylinder has a piston rod 48 pivoted to the end of an extension of the lever 36.

In order to prevent a drop in the delivery pressure of the regulator as the demand rate increases and the valve element 25 moves further from its seat 23, the downward force of the lever 36 against the diaphragm 31 must increase. This result is obtained by means of a compensator comprising a bell-crank 51 pivoted to the bracket 46 and having a weight 52 slidable on its longer arm and fastened in set position by a set-screw 53. The shorter arm of the bell-crank 51 is connected to the lever 36 by a link 55. The weight 52 acts to move the lever 36 downward and adds its force to that of the weight 42 on the lever 36. As the valve element 25 opens wider and the lever 36 moves downward, the bell-crank arm supporting the weight 52 moves further from a horizontal position and increases the effective lever arm through which the weight 52 acts. The compensator can be designed to cause the delivery pressure of the regulator to increase as the demand rate increases, and if this increase in delivery pressure is made substantially proportional to the additional line drop as the rate of flow increases, the gas pressure at a torch or other equipment down the line can be held substantially constant with variation in demand.

Fig. 3 is a diagram showing the effective lever arms of the weights 42 and 52 in the embodiment of the invention shown in Fig. 1. The lever 36 has its fulcrum at the screws 38. The lever arm of the weight 42 is the distance L and the force is applied to the diaphragm 31 at a distance $l$ from the fulcrum, giving the weight 42 a mechanical advantage of $L/l$. The force of the compensator is applied to the lever 36 at the point of connection of the link 55 to the lever, a distance X from the fulcrum. The magnitude of the compensator force depends on the effective lever arm with which the weight 52 tends to move the bell-crank 51 around its pivot connection to the bracket 46. This effective lever arm is equal to the distance Z in Fig. 3 and becomes greater as the angle $a$ between the horizontal and the long arm of the bell-crank becomes less. If the length of the long arm of the bell-crank from its pivot axis to the effective point of application of the force of weight 52 is equal to M, and the link 55 connects with the short arm of the bell-crank at a distance $m$ from its pivot axis, then the additional regulator pressure which is developed because of the compensator is equal to $$\frac{wMX \cos a}{mlA}$$

where $w$ is the mass of weight 52 and A is the area of the diaphragm 31.

If it is desirable to hold the delivery pressure substantially constant while the rate of flow increases to a given value, the compensator must be designed so that the regulator pressure which it develops increases by the same amount that the pressure would drop with the increased flow if the regulator were not equipped with the compensator.

If an increase in delivery pressure is desirable to compensate for line drop with an increase in the rate of flow, the compensator is designed so that its effect on the pressure developed by the regulator is to produce a rise which exceeds the ordinary pressure drop in the regulator by an amount equal to the additional pressure drop in the line.

It will be understood that the compensator shown in the drawing and described above is illustrative, and other means for increasing the force against the diaphragm as the valve displacement increases will suggest themselves.

The operation of the regulator shown in the drawing is as follows:

High-pressure gas flows through a filter 58 into the regulator. If the pressure in the reduced-pressure chamber 21 is less than that for which the regulator is set, the valve element 25 will be in open position and gas will continue to flow around the valve element and into the reduced-pressure chamber until the gas pressure becomes sufficient to raise the diaphragm 31 against the downward force of the lever 36. The supply pressure and/or the pressure of the spring 27 moves the valve element 25 toward closed position as the gas pressure in the reduced-pressure chamber raises the diaphragm 31. As the demand rate increases and gas flows more rapidly from the reduced-pressure chamber 21, it is necessary for the valve element to move farther from its seat so that more gas can flow into the reduced-pressure chamber to maintain the delivery pressure.

In order to increase the displacement of the valve element 25 from its seat 23, so that the gas flow through the regulator is at a higher rate, there must be either a decrease in the gas pressure under the diaphragm 31 or an increase in the downward force against the diaphragm. A reduction in this gas pressure would involve a drop in the delivery pressure of the regulator, which would be contrary to good regulation. The compensator of this invention increases the downward pressure on the diaphragm and causes the valve to open wider so that the flow of gas from the high-pressure chamber is sufficient to prevent any substantial drop in the delivery pressure of the regulator; or the increased force exerted by the compensator may be such that the delivery pressure of the regulator increases as the rate of flow becomes greater, higher pressure under the diaphragm being necessary to balance the increased downward force of the lever 36 against the diaphragm.

Modifications in the illustrated embodiment of the invention may be made, and some features of the invention may be used without others. Terms of orientation, such as "upward" and "downward" are relative.

I claim:

1. A gas pressure regulator comprising a substantially horizontal section of piping with couplings at opposite ends for connecting the regulator in a gas supply line, a partition inside the piping and near one end for dividing the interior of the piping into a high pressure and a low pressure chamber, a diaphragm housing the lower part of which is integral with said piping adjacent the partition, said diaphragm housing enclosing a chamber which communicates with both the high and low pressure chambers in the piping, a valve element for controlling the passage of gas from the high pressure chamber into the diaphragm housing, a spring urging the valve element into closed position, a diaphragm in the housing and above the valve element for controlling the operation of said valve element, and means for exerting a downward pressure on the diaphragm to move the valve element into open position, said means including a lever extending lengthwise along and close to the piping, a bracket on the piping in position to serve as a fulcrum for the lever, a weight loading the end of the lever away from the bracket, and means between the bracket and the weighted end of the lever for transmitting the load of said weight and lever to the diaphragm.

2. A pressure regulator comprising an elongated horizontal housing, a high pressure inlet, a reduced pressure chamber within the housing, a valve for controlling the passage of gas from said inlet to the reduced pressure chamber, a spring for closing the valve, a weighted lever extending lengthwise along the outside of said housing and fulcrumed at one end to a fluid extension of said housing, a diaphragm located under the weighted lever and exposed to the gas pressure in the chamber, means for transmitting force from said weighted lever to the diaphragm and valve to hold the valve open until the pressure in said chamber reaches a value to overcome the load of said lever on the diaphragm and valve, a second weighted lever having a pivot connection with said elongated horizontal housing at a point near the free end of said first lever, and a link connecting the first lever with an arm of the second lever, the link connections being constructed and arranged to move the second weighted lever in a direction to increase the force exerted by the first lever on the diaphragm and valve as the valve opening increases with the rate of flow.

JAMES K. HAMILTON.